(12) United States Patent
Simons et al.

(10) Patent No.: US 8,856,069 B2
(45) Date of Patent: Oct. 7, 2014

(54) COMBINED SAVE AND VALIDATION LOGIC

(75) Inventors: Michael R Simons, Fargo, ND (US);
Daniel Seefeldt, West Fargo, ND (US);
Steven P Anonsen, Fargo, ND (US);
Steven V. Harter, Fargo, ND (US); Eric B Beran, Birkeroed (DK)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 12/758,051

(22) Filed: Apr. 12, 2010

(65) Prior Publication Data

US 2011/0252009 A1    Oct. 13, 2011

(51) Int. Cl.
*G06F 17/30*    (2006.01)

(52) U.S. Cl.
CPC .... *G06F 17/30587* (2013.01); *G06F 17/30306* (2013.01); *G06F 17/30371* (2013.01)
USPC .......................................... 707/615; 707/694

(58) Field of Classification Search
CPC .................... G06F 17/30575; G06F 17/30371; G06F 17/30368
USPC .................................................. 707/615, 694
See application file for complete search history.

(56) References Cited

U.S. PATENT DOCUMENTS

| | | | |
|---|---|---|---|
| 7,155,429 B2 * | 12/2006 | Madduri et al. ..................... 1/1 | |
| 7,325,014 B1 | 1/2008 | Kennedy | |
| 7,467,149 B2 | 12/2008 | Gaurav et al. | |
| 7,599,901 B2 | 10/2009 | Mital et al. | |
| 2003/0046639 A1 | 3/2003 | Fai et al. | |
| 2006/0225032 A1 | 10/2006 | Klerk et al. | |
| 2007/0239751 A1 * | 10/2007 | Wei et al. ....................... | 707/101 |
| 2008/0109467 A1 | 5/2008 | Brookins et al. | |
| 2010/0185593 A1 * | 7/2010 | Wong et al. ................... | 707/684 |
| 2011/0125642 A1 * | 5/2011 | Kamal ............................ | 705/44 |
| 2011/0246316 A1 * | 10/2011 | Cincera ........................... | 705/17 |

OTHER PUBLICATIONS

Kurt, Evenepoel"Free your Model from View-Imposed Restraints with Entity Framework Interceptors", Retrieved at <<http://www.codeproject.com/KB/linq/entity_interceptors.aspx?display=Print>> May 2009, pp. 11.

(Continued)

*Primary Examiner* — Rehana Perveen
*Assistant Examiner* — Alexander Khong
(74) *Attorney, Agent, or Firm* — Kevin Sullivan; Kate Drakos; Micky Minhas

(57) ABSTRACT

Methods, systems, and computer-readable media for combined saving and validation are disclosed. A particular method includes receiving a command to save changes associated with a change set to a data storage device. Entities of the change set are validated and one or more pre-operation commands are executed on the change set. When a pre-operation command modifies one or more first entities of the change set, the first entities are revalidated. The method also includes executing a data operation based on the change set and executing one or more post-operation commands on the change set. When a post-operation command modifies one or more second entities of the change set, the second entities are re-validated.

20 Claims, 4 Drawing Sheets

(56) References Cited

OTHER PUBLICATIONS

Laudati, Peter, "Enterprise Development Reference Architecture", Retrieved at <<http://www.google.co.in/url?sa=t&source=web&ct=res&cd=4&ved=0CBMQFjAD&url=http%3A%2F%2Fwww.njmsdev.org%2FMeetings%2F2005%2F1-6-2005%2FEnterprise%2520Development%2520Reference%2520Architecture-Peterlau.ppt&rct=j&q=Save+Pipeline+with+Validation+and+Business+Logic+Interception&ei=921hS6jyL4j20gTKrJTjDA&usg=AFQjCNGvk3aPkiVfW_okryJiihIOSWOb0w>> Jan. 29, 2010, p. 36

Goedertier, et al., Rule-based Business Process Modeling and Execution, Retrieved at <<http://www.econ.kuleuven.be/tew/academic/infosys/Members/Vthienen/PUB/VORTE05/goedertierVORTE2005.pdf>> Jan. 29, 2010, pp. 8.

* cited by examiner

COMBINED SAVE AND VALIDATION LOGIC

BACKGROUND

Enterprise applications typically copy data from disk into memory (e.g., from a disk drive to a random access memory (RAM)) before operating on the data. Modifications to data are made to copies of the data in the memory. Occasionally, modified data may be written back to disk. However, the modified data may be invalid (e.g., the data modifications may have violated a system constraint). Therefore, data validation is typically performed before starting the process of saving data to disk. For example, each individual modification to the data may be validated. When multiple applications store data to a single disk, each application may perform individual data validation.

SUMMARY

A data saving framework that provides a combination of saving, validation, and business logic functionality is disclosed. The framework may include six software interception points (e.g., pre-save, entity validation, pre-operation commands, data operation, post-operation commands, and post-save) that are executed in order. Each interception point may provide users an opportunity to define validation tests and business logic functionality. For example, users may have granular control over particular data operations such as data entity insertion, update, and deletion. The framework may also provide recursive validation to maintain data integrity. For example, if any entities of a change set to be saved to a data storage device are modified during the execution of logic at an interception point, the modified entities may be revalidated before the operation is completed. When all entities have been validated, the data may be saved to the data storage device. The framework may execute entirely at a server and may provide common saving, validation, and business logic functionality to multiple application clients.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
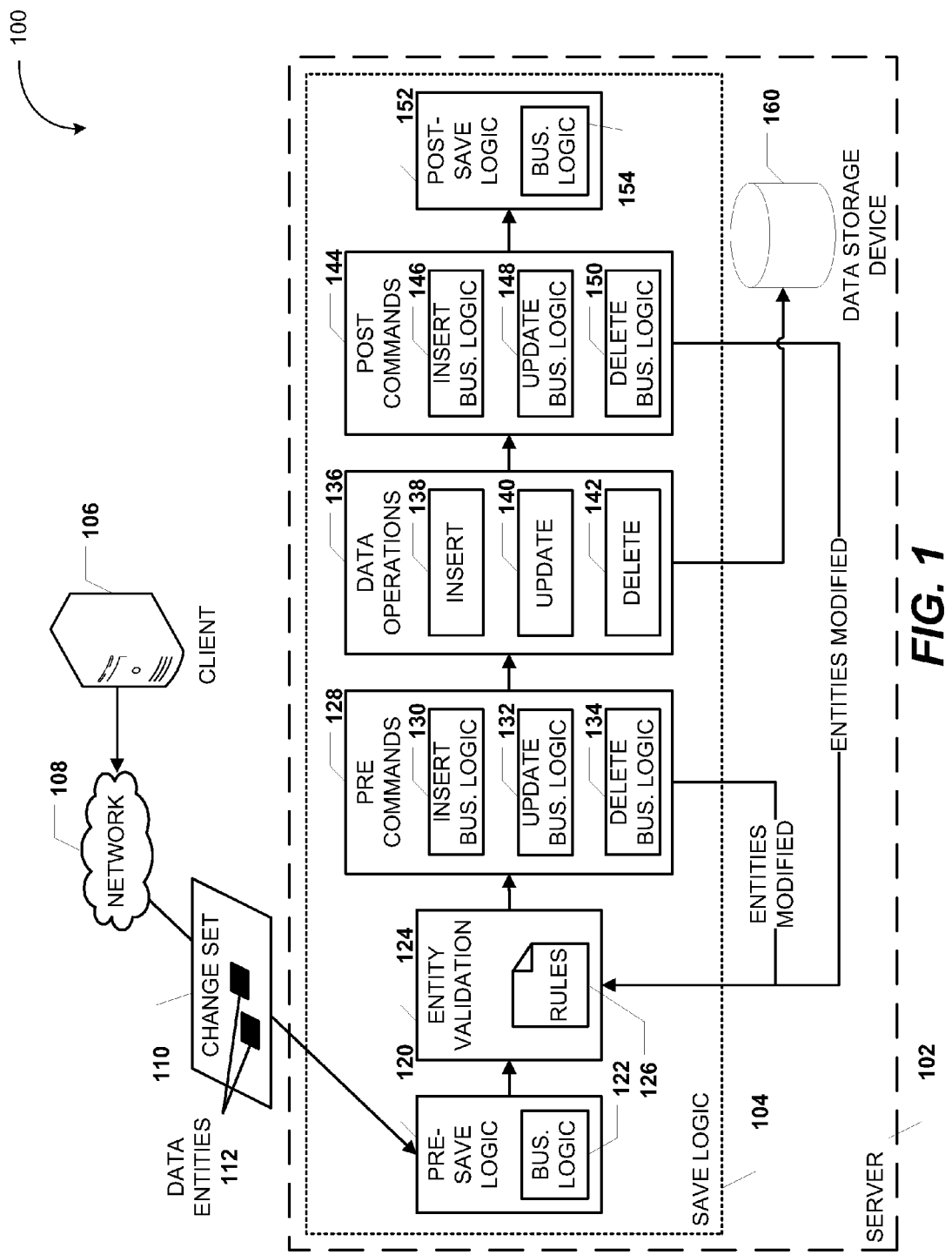
FIG. 1 is a diagram to illustrate a particular embodiment of a system of saving a change set, where the system executes combined save and validation logic.

In a particular embodiment, a computer-implemented method includes receiving a command to save a set of changes (hereafter referred to as a "change set") to a data storage device. For example, the change set may include one or more changed entities that are to be saved to the data storage device. The method also includes validating the entities of the change set and executing one or more pre-operation commands (e.g., business logic operation) on the change set. When a pre-operation command modifies one or more first entities of the change set or adds one or more first entities (e.g., extra entities) to the change set, the method revalidates the first entities. The method includes executing a data operation based on the change set and executing one or more post-operation commands on the change set. When a post-operation command modifies one or more second entities of the change set or adds one or more second entities (e.g., extra entities) to the change set, the method revalidates the second entities. For example, the computer-implemented method may enable all entities of a change set to be saved to the data storage device via a single database transaction.

In another particular embodiment, a computer-readable medium includes instructions, that when executed by a computer, cause the computer to execute save logic configured to save changes associated with a change set to a data storage device. The save logic includes a validation module configured to validate entities of the change set based on one or more rules. The save logic also includes a pre-operation command module configured to execute one or more pre-operation commands on the change set and to execute the validation module with respect to entities modified during execution of the pre-operation commands. The save logic further includes an operation module configured to execute a data operation based on the change set. The save logic includes a post-operation command module configured to execute one or more post-operation commands on the entities in the change set and to execute the validation module with respect to all entities of the change set.

In another particular embodiment, a computer-readable medium includes instructions, that when executed by a computer, cause the computer to receive a command to save changes associated with a change set to a data storage device. The change set includes one or more changed entities and the transaction includes a data operation. The instructions also cause the computer to validate one or more entities in the change set and to execute one or more pre-operation commands on the change set. The instructions further cause the computer to revalidate one or more first entities modified during execution of the pre-operation commands. The instructions cause the computer to execute the data operation based on the change set and to execute one or more post-operation commands on the change set. The instructions also cause the computer to revalidate all entities in the change set. The instructions further cause the computer to save data to the data storage device (e.g., by saving one or more of the change set, a modified version of the change set, or a result of the data operation).

FIG. 1 depicts a particular embodiment of a system 100 of saving a change set 110, the system executing combined save and validation logic. The system 100 includes a server 102 communicatively coupled to one or more clients (e.g., an illustrative client 106) via one or more networks (e.g., an illustrative network 108).

The server 102 may receive the change set 110 from the client 106 via the network 108. The change set 110 may represent one or more transactions associated with one or more data entities 112. For example, the change set 110 may represent recently inserted, updated, or deleted database entities by the client 106. Committing transactions via a change set instead of one-entity-at-a-time may enable batch commit of transactions at the system 100. Save logic 104 at the server 102 may commit transactions to a data storage device 160.

The data storage device 160 may include one or more disk-based storage devices. It should be noted that although the data storage device 160 is illustrated as within the server 102, the data storage device 160 may instead be network attached storage (NAS) or some other storage device remotely located from the server 102.

The save logic 104 may provide combined saving, validation, and business logic functionality. For example, the save logic 104 may be a six-stage save pipeline that includes pre-save logic 120, an entity validation module 124, a pre-operation command module 128, a data operation module 136, a post-operation command module 144, and post-save logic 152. For example, the save logic 104 may be implemented as a software code path that includes interception points corresponding to each of the pre-save logic 120, the entity validation module 124, the pre-operation command module 128, the data operation module 136, the post-operation command module 144, and the post-save logic 152. In a particular embodiment, users of the system 100 may provide user-specified code (e.g., tests or business logic operations) to be executed at one or more of the pre-save logic 120, the entity validation module 124, the pre-operation command module 128, the data operation module 136, the post-operation command module 144, and the post-save logic 152. During execution of the save logic 104, control may generally flow from the pre-save logic 120 to the entity validation module 124 to the pre-operation command module 128 to the data operation module 136 to the post-operation command module 144 and to the post-save logic 152. That is, control may generally flow left-to-right as illustrated in FIG. 1.

The pre-save logic 120 may receive the change set 110 from the client 106 and may execute pre-save commands on the change set 110. For example, the pre-save logic 120 may include pre-save business logic commands 122. In a particular embodiment, the pre-save business logic commands 122 include user-specified commands that are executed each time execution of the save logic 104 begins. For example, the pre-save business logic commands 122 may include a user-specified logging command to log a transaction start date and time for committing the transaction(s) associated with the change set 110 to the data storage device 160.

The entity validation module 124 may be configured to validate the data entities 112 of the change set 110. For example, the entity validation module 124 may include pre-defined and user-specified validation tests to determine whether any of the data entities 112 violates one or more rules 126. The rules 126 may include pre-defined and user-defined rules such as type-checking rules, bounds-checking rules, dependency-checking rules, business logic conditions, and any other type of rule. For example, the rules 126 may include a first rule indicating that an "ID" field of a personnel database record may not be "NULL" and a second rule indicating that a "Name" field of the personnel database record may not be blank (e.g., an empty string " "). Thus, the entity validation module 124 may provide server-side data validation before transactions are committed to the data storage device 160.

The pre-operation command module 128 may be configured to execute pre-defined and user-specified commands prior to execution of a data operation (e.g., an insert operation, an update operation, or a delete operation). For example, the pre-operation command module 128 may include business logic 130 that executes before each insert operation, business logic 132 that executes before each update operation, and business logic 134 that executes before each delete operation. For example, the business logic 130 may include a command to increment a global entity counter before a new data entity is inserted (e.g., created). As another example, the business logic 132 may include a command to increment a global transaction counter before a data entity is updated. As yet another example, the business logic 134 may include a command to decrement the global entity counter before an existing data entity is deleted. Examples of user-specified business logic commands include, but are not limited to, modifying a data entity, verifying that a data entity complies with a business logic condition, and outputting information to an audit log file.

The pre-operation command module 128 may also enable recursive validation of modified data entities. For example, if one or more first data entities of the change set 110 are modified during execution of the pre-operation command module 128 (e.g., by the business logic 130, 132, or 134), the first data entities may be revalidated via re-execution of the entity validation module 124. The pre-operation command module 128 may be re-executed as needed after re-execution of the entity validation module 124. After the first modified data entities are revalidated, control may flow to the data operation module 136.

The data operation module 136 may be configured to execute data operations based on the change set 110. For example, the data operation module 136 may include insert logic 138 to insert data entities as specified by the change set 110, update logic 140 configured to update data entities as specified by the change set 110, and delete logic 142 to delete data entities as specified by the change set 110. In a particular embodiment, each of the insert logic 138, the update logic 140, and the delete logic 142 may also include user-specified commands to be executed during data entity creation, update, and deletion, respectively. In a particular embodiment, executing the data operations based on the change set 110 includes modifying data stored at the data storage device 160.

The post-operation command module 144 may be configured to execute pre-defined and user-specified commands after the execution of a data operation (e.g., an insert operation, an update operation, and a delete operation). For example, the post-operation command module 144 may include business logic 146 that executes after each insert operation, business logic 148 that executes after each update operation, and business logic 150 that executes after each delete operation.

The post-operation command module 144 may also enable recursive validation of modified data entities. For example, if one or more second data entities of the change set 110 are modified during execution of the post-operation command module 144 (e.g., by the business logic 146, 148, or 150), the second data entities may be revalidated via re-execution of the entity validation module 124. The pre-operation command module 128, the data operation module 136, and the post-operation command module 144 may be re-executed as needed after re-execution of the entity validation module 124.

The post-save logic 152 may execute post-save commands after changes are saved to the data storage device 160. For example, the post-save logic 152 may include post-save business logic commands 154. In a particular embodiment, the post-save business logic commands 154 include user-specified commands that a user indicates should be executed each time execution of the save logic 104 ends. For example, the post-save business logic commands 154 may include a user-specified logging command to log a transaction end date and time. As another example, the post-save business logic commands 154 may include cleaning up (e.g., deallocating) computing resources that were allocated by the pre-save business logic commands 120.

During operation, the save logic 104 may receive a command from the client 106 to save changes associated with the change set 110 to the data storage device 160. During execution (e.g., illustrated as left-to-right in FIG. 1), the save logic 104 may provide save, validation, and business logic functionality at various interception points.

For example, the save logic 104 may be part of a point-of-sale system that generates an "Order" data entity for each order. The save logic 104 may thus include user-specified validation tests and business logic commands that may be specific to a point-of-sale system. For example, a "LastModifiedDate" may be added to each new "Order" data entity by adding the following to the business logic 130 executed before each insert operation:

```
Sub Order_Inserting(order As Order)
    order.LastModifiedDate = DateTime.Now
End Sub
```

It should be noted that because a "LastModifiedDate" of the "Order" entity is added by the above code, the entity validation module 124 may be re-executed to validate the "LastModifiedDate" after execution of the above code.

The "LastModifiedDate" of an "Order" data entity may be updated when the data entity is updated by adding the following to the business logic 132 executed before each update operation:

```
Sub Order_Updating(order As Order)
    order.LastModified = DateTime.Now
End Sub
```

It should be noted that because the "LastModifiedDate" of the "Order" entity is modified by the above code, the entity validation module 124 may be re-executed to revalidate the "LastModifiedDate" after execution of the above code.

As another example, inventory for an "Order" data entity may be allocated whenever the data entity's "Status" changes from 'Pending' to 'ReadyToShip' by adding the following to the business logic 132 executed before each update operation:

```
Sub Order_Updating(order As Order)
    If order.Status.OriginalValue = "Pending" And order.Status.Value =
    "ReadytoShip"
        Then
        For Each orderLine In order.Lines
            orderLine.Item.QuantityOnHand =
                orderLine.Item.QuantityOnHand − orderLine.Quantity
            Next
    End If
End Sub
```

It should be noted that because the "QuantityOnHand" is modified by the above code, the entity validation module 124 may be re-executed to revalidate the "QuantityOnHand" after execution of the above code. For example, the entity validation module 124 may include the following user-specified validation test:

```
Sub Item_Validating(item as Item, ByRef Results As ValidationResults)
    If item.QuantityOnHand < 0 Then
        Results.AddError("Quantity cannot be less than zero")
End Sub
```

When an "Order" data entity is deleted, each "OrderLine" in the data entity may automatically be deleted by adding the following to the business logic 134 executed before each delete operation:

```
Sub Order_Deleting(order As Order)
    For Each orderLine in order.Lines
        orderLine.Delete( )
    Next
End Sub
```

Changes made to the "Order" data entities may be audited (e.g., logged) by adding the following to the business logic 146, 148, and 150 executed after each insert operation, update operation, and delete operation, respectively:

```
Sub Order_Inserted(order As Order)
    Auditlog.Write(String.Format("Order {0} has been inserted", order))
End Sub
Sub Order_Updated(order As Order)
    Auditlog.Write(String.Format("Order {0} has been updated", order))
End Sub
Sub Order_Deleted(order As Order)
    Auditlog.Write(String.Format("Order {0} has been deleted", order))
End Sub
```

After execution of the pre-save logic 120, the entity validation module 124, the pre-operation command module 128, the data operation module 136, the post-operation command module 144, and the post-save logic 152, the insert, update, and/or delete operations associated with the change set 110 may be committed to the data storage device 160. It should be noted that although the examples disclosed herein are associated with the VB.net programming language, business logic commands and operations may be represented in any computer-recognizable language.

It will be appreciated that the save logic 104 may provide combined server-side saving, validation, and business logic functionality. Combining saving, validation, and business logic at a server may provide common save pipeline procedures to multiple clients of the server without execution of individualized client-side validation tests. Thus, the save logic 104 may provide faster and less redundant storage device level validation when compared with application level validation. It will also be appreciated that the save logic 104 may maintain data integrity via recursive validation of data entities that are modified during execution of user-specified business logic commands. It will further be appreciated that the save logic 104 may provide multiple software interception points for execution of user-specified code, thereby enabling granular control of the save process.

Figure 2:
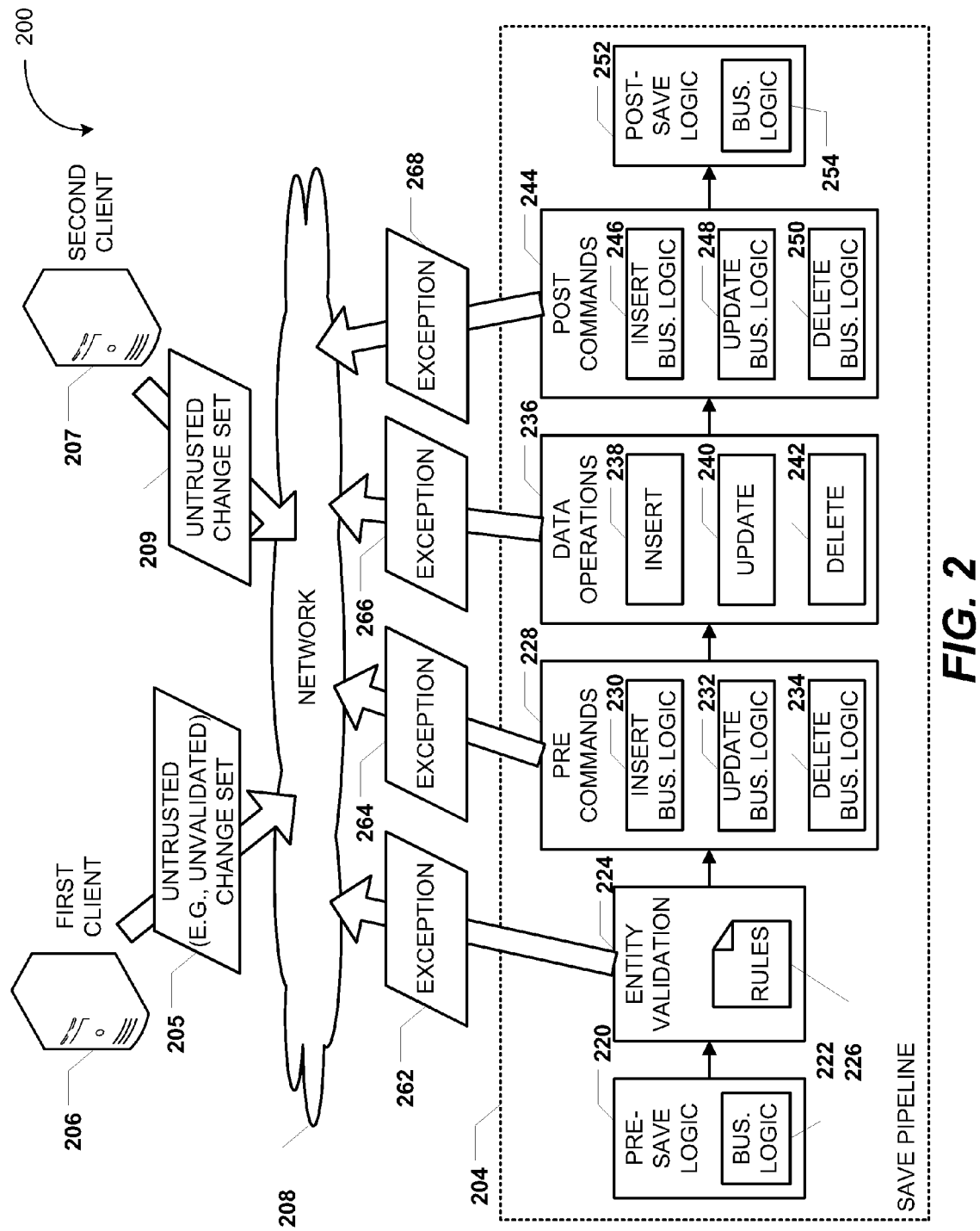
FIG. 2 is a diagram to illustrate communications that may occur at the system of FIG. 1.

FIG. 2 is a diagram to illustrate a particular embodiment of communications at the system 100 of FIG. 1, and is generally designated 200. The system 200 includes a save pipeline 204 communicatively coupled to a plurality of clients (e.g., an illustrative first client 206 and an illustrative second client 207) via a network 208. For example, the plurality of clients may include database applications, web applications, business logic applications, or another application or a computing device that stores data to one or more data storage devices.

The save pipeline 204 may provide combined saving, validation, and business logic functionality. For example, the save pipeline 204 may include pre-save logic 220, an entity validation module 224, a pre-operation command module 228, a data operation module 236, a post-operation command module 244, and post-save logic 252. In an illustrative embodiment, the pre-save logic 220 is the pre-save logic 120 of FIG. 1 and the pre-save business logic commands 222 are the pre-save business logic commands 122 of FIG. 1. The entity validation module 224 may be the entity validation module 124 of FIG. 1 and the rules 226 may be the rules 126 of FIG. 1. The post-save logic 252 may be the post-save logic 152 of FIG. 1 and the post-save business logic commands 254 are the post-save business logic commands 154 of FIG. 1. The modules 228, 236, and 244 may be the modules 128, 136, and 144 of FIG. 1 and the logic 230, 232, 234, 238, 240, 242, 246, 248, and 250 may be the logic 130, 132, 134, 138, 140, 142, 146, 148, and 150 of FIG. 1.

The save pipeline 204 may receive change sets from the clients 206, 207. In a particular embodiment, the change sets are in an untrusted state (e.g., unvalidated) and thus the change sets are validated prior to committing transactions at a data storage device. For example, the save pipeline 204 may receive a first untrusted change set 205 from the first client 206 and a second untrusted change set 209 from the second client 207.

In operation, when the save pipeline 204 receives a command to save changes associated with a change set (e.g., one of the untrusted change sets 205, 209), the save pipeline 204 may execute the pre-save logic 220, the entity validation module 224, the pre-operation command module 228, the data operation module 236, the post-operation command module 244, and the post-save logic 252. When any of the modules 224, 228, 236, 244 fails, the save pipeline 204 may abort the transaction and may raise an exception (e.g., via an exception module (not shown) of the save pipeline 204) that may be transmitted back to the client. In a particular embodiment, the save pipeline 204 may also abort the transaction and raise an exception when any pre-save commands at the pre-save logic 220 or post-save commands at the post-save logic 252 fail.

For example, when the entity validation module 224 fails (e.g., a particular data entity violates one or more of the rules 226), the transaction may be aborted and a validation exception 262 may be raised. When the pre-operation command module 228 fails, the transaction may be aborted and a pre-operation exception 264 may be raised. When the data operation module 236 fails, the transaction may be aborted and an operation exception 266 may be raised. When the post-operation command module 244 fails, the transaction may be aborted and a post-operation exception 268 may be raised. When an exception is raised at the save pipeline 204, a failed save event may be generated. For example, the failed save event may be logged, transmitted to the client, or may trigger execution of user-specified code (e.g., error-handling code).

It will be appreciated that the save pipeline 204 may provide combined saving, validation, and business logic functionality to multiple clients without execution of individualized client-side validation tests. Thus, the save pipeline 204 may provide faster and less redundant storage device level validation when compared to application level validation. It will also be appreciated that because the save pipeline 204 provides validation functionality, the save pipeline 204 may receive and save untrusted change sets from multiple clients. It will thus be appreciated that the save pipeline 204 may be integrated into existing systems with little modification of existing client-side application code.

Figure 3:
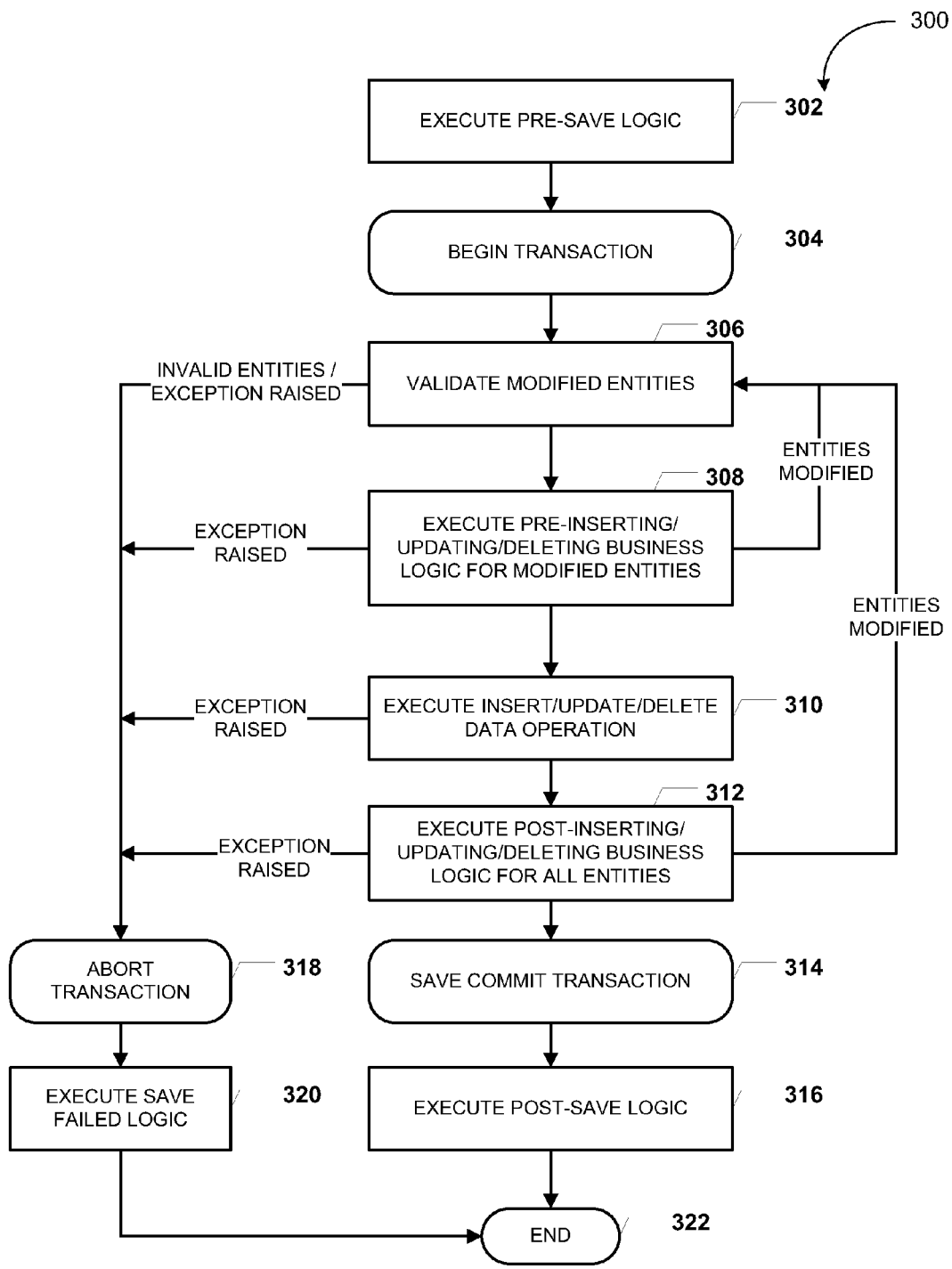
FIG. 3 is a flow diagram to illustrate a particular embodiment of a method of saving a change set, in which the method executes combined save and validation logic.

FIG. 3 is a flow diagram to illustrate a particular embodiment of a method 300 of saving a change set, the method 300 including execution of combined save and validation logic. In an illustrative embodiment, the method 300 may be performed by the system 100 of FIG. 1 or the system 200 of FIG. 2.

The method 300 includes executing pre-save logic, at 302. For example, in FIG. 1, the pre-save logic 120 may be executed after a command to save changes associated with the change set 110 is received at the save logic 104. The method 300 may also optionally include beginning a transaction, at 304. For example, in FIG. 1, execution of the transaction associated with the change set 110 may begin.

The method 300 further includes validating modified entities, at 306. For example, in FIG. 1, the entity validation module 124 may validate the data entities 112 of the change set 110. When validation fails, the method 300 optionally includes aborting the transaction, at 318, and executing save failed logic, at 320. For example, the transaction may be aborted, the validation exception 262 may be raised and save failed logic may be executed, generating a failed save event as described with reference to FIG. 2.

The method 300 includes executing pre-inserting, pre-updating, and/or pre-deleting business logic for the modified entities, at 308. For example, in FIG. 1, the business logic 130, 132, and/or 134 may be executed. When execution of the pre-inserting, pre-updating, and/or pre-deleting business logic fails, the method 300 optionally includes aborting the transaction, at 318, and executing save failed logic, at 320. For example, the transaction may be aborted, the pre-operation command exception 264 may be raised, and save failed logic may be executed, generating a failed save event as described with reference to FIG. 2. When execution of the pre-inserting, pre-updating, and/or pre-deleting business logic modifies one or more first entities of the change set, the method 300 returns to 306 to re-validate the one or more first entities.

The method 300 also includes executing the insertion, update, and/or deletion operation associated with the transaction, at 310. For example, in FIG. 1, the logic 138, 140, and/or 142 may be executed. When execution of the insertion, update, and/or deletion operation fails, the method 300 optionally includes aborting the transaction, at 318, and executing save failed logic, at 320. For example, the transaction may be aborted, the operation exception 266 may be raised, and save failed logic may be executed, generating a failed save event as described with reference to FIG. 2.

The method 300 further includes executing post-inserting, post-updating, and/or post-deleting business logic, at 312. For example, in FIG. 1, the business logic 146, 148, and/or 150 may be executed. When execution of the post-inserting, post-updating, and/or post-deleting business logic fails, the method 300 optionally includes aborting the transaction, at 318, and executing save failed logic, at 320. For example, the transaction may be aborted, the post-operation command exception 268 may be raised, and save failed logic may be executed, generating a failed save event as described with reference to FIG. 2. When execution of the post-inserting, post-updating, and/or post-deleting business logic modifies one or more second entities of the change set, the method 300 returns to 306 to re-validate the one or more second entities.

The method 300 optionally includes committing the transaction, at 314. For example, in FIG. 1, the transaction may be committed to the data storage device 160. The method 300 also includes executing post-save logic, at 316. For example, in FIG. 1, the post-save logic 152 may be executed. The method 300 ends, at 322.

It will be appreciated that the method 300 of FIG. 3 may execute business logic and validation with respect to modified entities of a change set (e.g., during execution of pre-operation commands, at 308) as well as with respect to all entities of the change set (e.g., during execution of post-operation commands, at 312). It will thus be appreciated that the method 300 of FIG. 3 may perform a validation in situations in which a modification to a data entity results in a modification to another previously unmodified data entity. It should be noted that various elements of the method 300 of FIG. 3 may be optional. For example, the elements 304, 314, and 318-320 may be optional.

Figure 4:
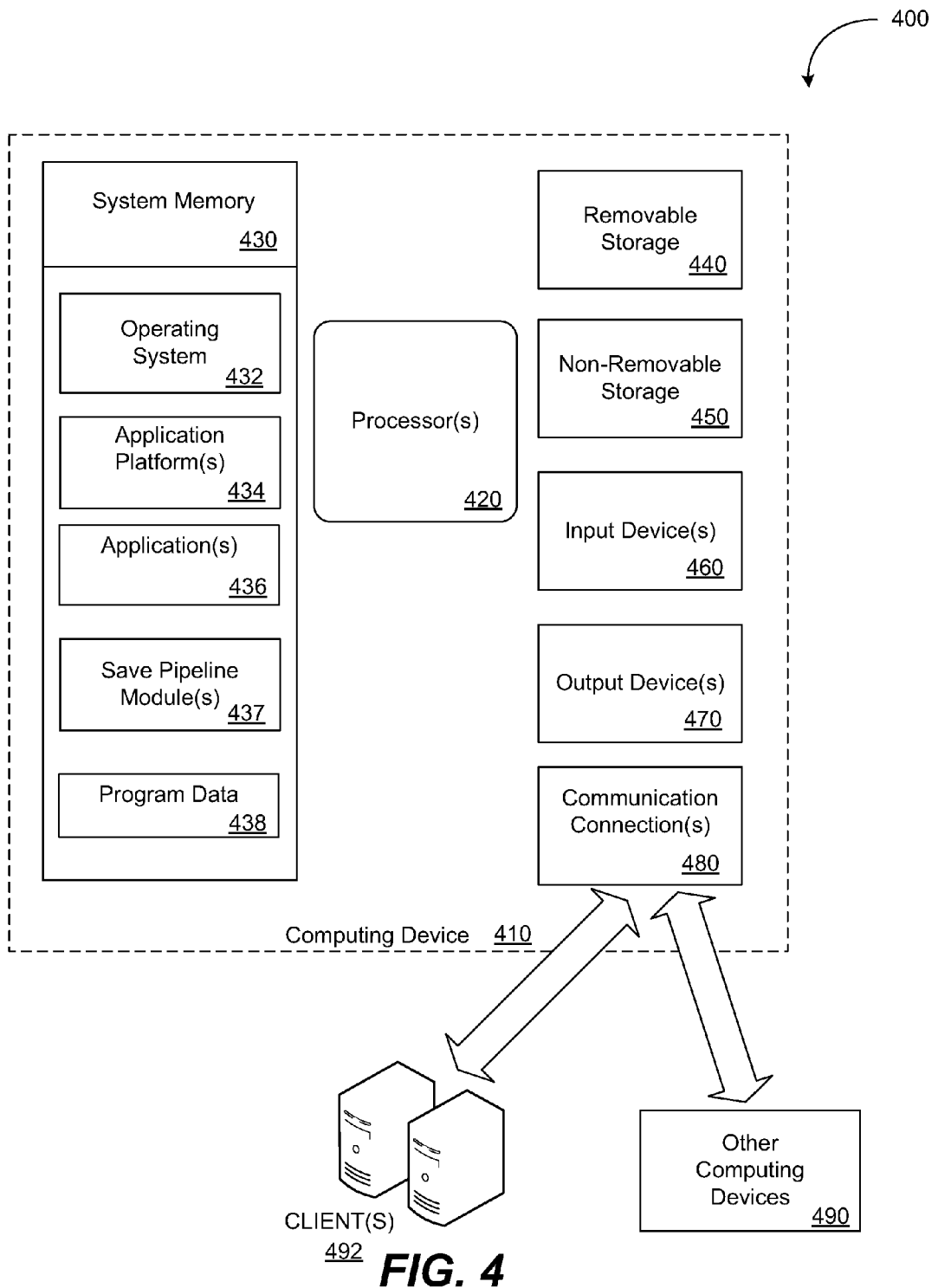
FIG. 4 is a block diagram of a computing environment including a computing device operable to support embodiments of computer-implemented methods, computer program products, and system components as illustrated in FIGS. 1-3.

FIG. 4 depicts a block diagram of a computing environment 400 including a computing device 410 operable to support embodiments of computer-implemented methods, computer program products, and system components according to the present disclosure. In an illustrative embodiment, the computing device 410 may include the server 102 of FIG. 1 or components thereof or the save pipeline 204 of FIG. 2 or components thereof. Each component of the server 102 of FIG. 1 or save pipeline 204 of FIG. 1 may include or be implemented using the computing device 410 or a portion thereof.

The computing device 410 includes at least one processor 420 and a system memory 430. Depending on the configuration and type of computing device, the system memory 430 may be volatile (such as random access memory or "RAM"), non-volatile (such as read-only memory or "ROM," flash memory, and similar memory devices that maintain stored data even when power is not provided), or some combination of the two. The system memory 430 typically includes an operating system 432, one or more application platforms 434, one or more applications, and program data 438. For example, the system memory 430 may include one or more save pipeline modules 437. In an illustrative embodiment, the save pipeline modules 437 include one or more of the logic 120, 152 of FIG. 1, the modules 124, 128, 136, 144 of FIG. 1, the logic 220, 252 of FIG. 2, and the modules 224, 228, 236, 244 of FIG. 2.

The computing device 410 may also have additional features or functionality. For example, the computing device 410 may also include removable and/or non-removable additional data storage devices such as magnetic disks, optical disks, tape, and standard-sized or flash memory cards. Such additional storage is illustrated in FIG. 4 by removable storage 440 and non-removable storage 450. Computer storage media may include volatile and/or non-volatile storage and removable and/or non-removable media implemented in any technology for storage of information such as computer-readable instructions, data structures, program components or other data. The system memory 430, the removable storage 440 and the non-removable storage 450 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 410. Any such computer storage media may be part of the computing device 410.

The computing device 410 may also have input device(s) 460, such as a keyboard, mouse, pen, voice input device, touch input device, etc. Output device(s) 470, such as a display, speakers, printer, etc. may also be included. The computing device 410 also contains one or more communication connections 480 that allow the computing device 410 to communicate with other computing devices 490 over a wired or a wireless network. In an illustrative embodiment, the wired or wireless network is the network 108 of FIG. 1 or the network 208 of FIG. 2. For example, the one or more communication connections 480 may enable communication with one or more clients 492. In an illustrative embodiment, the one or more clients 492 include the client 106 of FIG. 1, the first client 206 of FIG. 2, or the second client 207 of FIG. 2.

It will be appreciated that not all of the components or devices illustrated in FIG. 4 or otherwise described in the previous paragraphs are necessary to support embodiments as herein described. For example, the removable storage 440 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
receiving a command at a server, the command to save changes associated with a change set to a data storage device, the change set based on a data operation related to at least one of an update operation, a delete operation, or an insert operation, the change set representing inserted, updated, or deleted database entities made by a client device with respect to data stored at the client device, wherein the server includes a multi-stage save pipeline comprising a plurality of modules wherein two or more of the modules are configurable to execute user-specified executable code, and wherein each particular module of the two or more modules has particular user-specified executable code associated thereto, and wherein each particular user-specified executable code that is associated with each particular module is executed based on each particular module being invoked at the server, and wherein each particular user-specified executable code is distinct from the data operation;
validating, at the server, the database entities of the change set;
executing, at the server, one or more pre-operation commands on the change set, wherein the pre-operation commands are pre-defined and separately executed from the data operation;
when at least one of the user defined pre-operation commands modifies one or more first entities of the change set, revalidating the one or more first entities at the server;
executing, by the server, the data operation based on the change set;
executing, at the server, one or more post-operation commands on the change set, wherein the post-operation commands are pre-defined and separately executed from the data operation; and
when at least one of the post-operation commands modifies one or more second entities of the change set, revalidating the one or more second entities at the server.

2. The computer-implemented method of claim 1, further comprising committing a single transaction to the data storage device to save multiple changes associated with the change set.

3. The computer-implemented method of claim 1, wherein at least one of the post-operation commands comprises a user-specified command executed by the server.

4. The computer-implemented method of claim 3, wherein the user-specified command comprises a user-specified validation test.

5. The computer-implemented method of claim 3, wherein the user-specified command comprises a user-specified business logic command.

6. The computer-implemented method of claim 5, wherein the user-specified business logic command includes verifying that a data entity complies with a business logic condition, the business logic condition associated with a name field.

7. The computer-implemented method of claim 1, wherein the data operation is a combination of at least two of an update operation, a delete operation, or an insert operation.

8. The computer-implemented method of claim 1, further comprising aborting the data operation and raising an exception when validating the entities of the change set fails, a pre-operation command fails, or a post-operation command fails.

9. The computer-implemented method of claim 1, further comprising:
executing two or more pre-save commands by the two or more modules prior to validating the database entities of the change set by the server.

10. The computer-implemented method of claim 9, further comprising executing one or more post-save commands after saving the change set to the data storage device.

11. The computer-implemented method of claim 1, wherein the method is performed by a six-stage save pipeline.

12. The computer-implemented method of claim 1, further comprising receiving the change set from the client device that is remotely located from the server.

13. The computer-implemented method of claim 12, wherein the change set is received from the client device in an untrusted state.

14. The computer-implemented method of claim 12, wherein the client device comprises a computer device configured to execute a database application.

15. The computer-implemented method of claim 1, wherein validating the database entities of the change set comprises determining whether any of the database entities violates one or more rules.

16. A computer-readable storage device comprising instructions, that when executed by a computer, cause the computer to execute save logic configured to save changes associated with a change set to a data storage device on a server, the save logic comprising:
a multi-stage save pipeline comprising a plurality of modules wherein two or more of the modules are configurable to execute user-specified executable code, and wherein each particular module of the two or more modules has particular user-specified executable code associated thereto, and wherein each particular user-specified executable code that is associated with each particular module is executed based on invocation of the particular module at the server, and wherein the plurality of modules includes:
a validation module configured to validate entities of the change set at the server based on one or more rules, the change set representing uncommitted database operations performed by a client device with respect to data stored at the client device;
a pre-operation command module configured to execute one or more pre-operation commands on the change set and to execute the validation module with respect to entities modified during execution of the one or more pre-operation commands at the server;
an operation module configured to execute a data operation at the server based on the change set, the data operation related to at least one of an insert operation, a delete operation, or an update operation;
a post-operation command module configured to execute one or more post-operation commands on the change set and to execute the validation module with respect to entities modified during execution of the one or more post-operation commands at the server;
a save module at the server, the save module configured to commit a transaction related to the database operations to the data storage device; and wherein each particular user-specified executable code is separately executed from the data operation.

17. The computer-readable storage device of claim 16, wherein the one or more rules include at least one user-defined rule, wherein at least one of the pre-operation commands or the post-operation commands includes a user-defined business logic command, and wherein the transaction includes a batch commit that commits multiple changes of the change set during a single transaction.

18. The computer-readable storage device of claim 16, wherein the plurality of modules further comprises:
 a pre-save module configured to execute one or more pre-save commands on the change set;
 a post-save module configured to execute one or more post-save commands on the change set; and
 an exception module configured to generate an exception when any of the modules fails.

19. A computer-readable storage device comprising instructions, that when executed by a computer server, cause the computer server to:
 receive a command to save changes associated with a change set to a data storage device, wherein the change set comprises one or more entities related to at least one database operation performed by a client device with respect to data stored at the client device, the database operation related to at least one of an insert operation, a delete operation, or an update operation, wherein the instructions comprise a plurality of modules of a multi-stage save pipeline, wherein two or more of the modules are configurable to execute user-specified executable code, and wherein each particular module of the two or more modules has particular user-specified executable code associated thereto, and wherein each particular user-specified code associated with each particular module is executed based on invocation of the particular module at the server;
 validate the one or more entities of the change set at the computer server;
 execute, at the computer server, one or more pre-operation commands on the change set at a first stage of a pipeline and revalidate one or more first entities modified during execution of the one or more pre-operation commands;
 execute, at the computer server, the database operation based on the change set;
 execute, at the computer server, one or more post-operation commands on the change set at a second stage of the pipeline and revalidate one or more second entities modified during execution of the one or more post-operation commands; and
 wherein each particular user-specified executable code is separately executed from the data operation.

20. The computer-readable storage device of claim 19, wherein the computer server is coupled to a plurality of clients and configured to receive unvalidated change sets from each of the plurality of clients, each of the unvalidated change sets comprising uncommitted insert, update, or delete database changes made by a corresponding client device, and wherein the instructions, when executed, further cause the computer server to commit a transaction to the data storage device by saving the change set to the data storage device, saving a modified version of the change set to the data storage device, saving a result of executing the data operation to the data storage device, or any combination thereof.

* * * * *